(12) United States Patent
Louzir et al.

(10) Patent No.: US 9,824,249 B2
(45) Date of Patent: *Nov. 21, 2017

(54) ELECTRICAL ACTIVITY SENSOR DEVICE FOR DETECTING ELECTRICAL ACTIVITY AND ELECTRICAL ACTIVITY MONITORING APPARATUS

(71) Applicant: THOMSON LICENSING, Issy de Moulineaux (FR)

(72) Inventors: Ali Louzir, Rennes (FR); Jean-Yves Le Naour, Pace (FR); Jean-Marc Laheurte, Villiers sur Marne (FR); Prakash Sampath Gattupalli, Paris (FR); Stephane Protat, Tremblay en France (FR)

(73) Assignee: THOMSON LICENSING, Issy de Moulineaux (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/679,251

(22) Filed: Apr. 6, 2015

(65) Prior Publication Data

US 2015/0294127 A1    Oct. 15, 2015

(30) Foreign Application Priority Data

Apr. 11, 2014 (EP) .................................. 14305542

(51) Int. Cl.
*H04Q 5/22* (2006.01)
*G06K 7/10* (2006.01)
(Continued)

(52) U.S. Cl.
CPC ......... *G06K 7/10346* (2013.01); *G01D 4/002* (2013.01); *G06K 19/0716* (2013.01);
(Continued)

(58) Field of Classification Search
CPC ........... G06K 7/10346; G06K 19/0716; G06K 19/07786; G01D 4/002; H01Q 1/2225;
(Continued)

(56) References Cited

U.S. PATENT DOCUMENTS 6,018,324 A * 1/2000 Kitchener ................ H01Q 1/38
343/702
8,613,395 B2   12/2013 Kimura et al.
(Continued)

FOREIGN PATENT DOCUMENTS

EP        1667336       5/2013
WO    WO2013057059     4/2013

OTHER PUBLICATIONS

Chau et al., "Analysis and characterization of transponder antennae for radio frequency identification (RFID) systems", Packaging Technology and Science, vol. 19, No. 1, Nov. 30, 2005, pp. 33-44.
(Continued)

*Primary Examiner* — Zhen Y Wu
(74) *Attorney, Agent, or Firm* — Tutunjian & Bitetto, P.C.

(57) ABSTRACT

An electrical activity sensor attachable to a power cable of an electrical device for detecting an impulse generated in the power cable in response to a change in electrical power state of the electrical device, the electrical activity sensor comprising an antenna assembly comprising an antenna element operable to magnetically couple with an electrical pulse generated in the power cable to induce an electrical signal in response to a change in electrical power state of the electrical device; and at least one dipole type antenna configured operate as a half wave dipole in the operating frequency range of the antenna element and to magnetically couple to the antenna element wherein the dipole type conductor is
(Continued)

operable to wirelessly transmit data representative of the power state change of the electrical device to a remote reader.

17 Claims, 11 Drawing Sheets

(51) Int. Cl.
*G01D 4/00* (2006.01)
*G06K 19/07* (2006.01)
*G06K 19/077* (2006.01)
*H01Q 1/22* (2006.01)

(52) U.S. Cl.
CPC ..... *G06K 19/07786* (2013.01); *H01Q 1/2225* (2013.01); *Y02B 70/3266* (2013.01); *Y02B 90/241* (2013.01); *Y02B 90/248* (2013.01); *Y04S 20/242* (2013.01); *Y04S 20/32* (2013.01); *Y04S 20/52* (2013.01)

(58) Field of Classification Search
CPC  Y02B 70/3266; Y02B 90/241; Y02B 90/248; Y02B 20/242; Y02B 20/32; Y02B 20/52
USPC .......................................... 340/10.1; 343/793
See application file for complete search history.

(56) References Cited

U.S. PATENT DOCUMENTS

| | | | |
|---|---|---|---|
| 2004/0032376 A1* | 2/2004 | Ikramov | H01Q 1/36 343/895 |
| 2005/0065743 A1* | 3/2005 | Cumming | G01D 4/004 702/62 |
| 2006/0109384 A1 | 5/2006 | Miller-Smith et al. | |
| 2007/0072567 A1* | 3/2007 | Nagai | H01Q 3/26 455/205 |
| 2009/0195349 A1 | 8/2009 | Frader-Thompson et al. | |
| 2011/0063184 A1* | 3/2011 | Furumura | G06K 19/07749 343/856 |
| 2012/0013442 A1 | 1/2012 | Lee | |
| 2012/0280828 A1* | 11/2012 | Kim | H04Q 9/00 340/870.02 |
| 2013/0066576 A1* | 3/2013 | Cs | G01R 25/08 702/67 |
| 2013/0169398 A1* | 7/2013 | Sugita | H01Q 1/243 336/179 |
| 2013/0183851 A1* | 7/2013 | Takakura | H01R 13/465 439/490 |
| 2015/0130480 A1* | 5/2015 | Berkcan | H04Q 9/00 324/633 |

OTHER PUBLICATIONS

Cleode: "ZigBee Power Plug ZPLUG"; User Manual 3.0 Document: UM_ZPLUG_20090903_001_03_00; pp. 1-14.
Netvox: "Intelligent Home Automation System based on ZigBee Wireless Sensor Network Technology"; Product Catalogue 2011; pp. 1-74.
ABI Research Report: "Home Automation and Monitoring"; Home Control, Energy Management, Media Management, Home and Healthcare; Apr. 29, 2011; pp. 1-58.
ALN-9613 SIT INLAY: "Alien Technology ALN-9613 "SIT""; 2013 Alien Technology Corporation Jun. 27, 2013; pp. 1-4.
MuTRAK UHF Tag; Datasheet TAGSYS RFID e-connecting goods; TAGSYS Nov. 23, 2012; 2012; pp. 1-2.
"AK Tag UHF Gen 2"; TAGSYS RFID e-connecting goods; Datasheet; TAGSYS 2007; pp. 1-2.
Son et al, "Design of RFID tag antennas using an inductively coupled feed," Electronics Letters, vol. 41, Issue No. 18, pp. 994-996, Sep. 2005.
Search Report dated Sep. 16, 2014.

\* cited by examiner

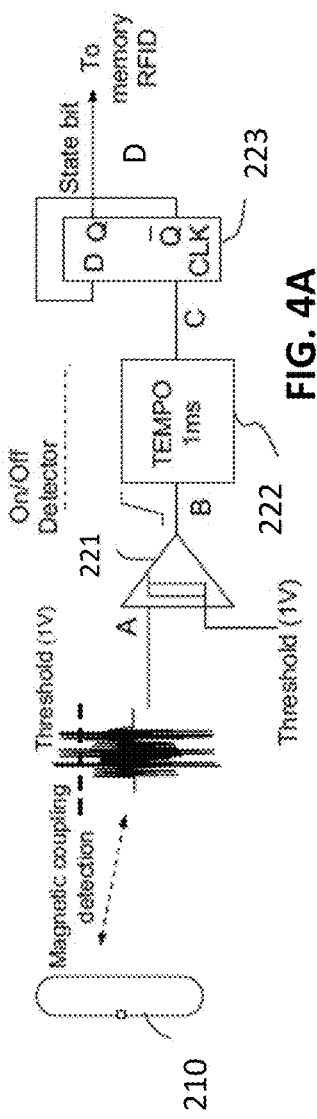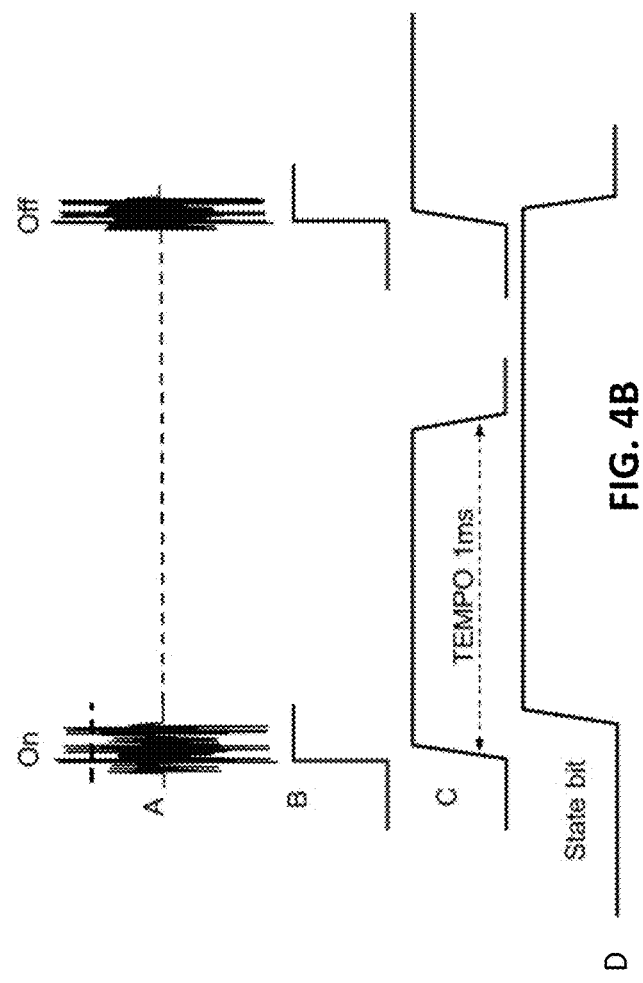
FIG. 4A
FIG. 4B

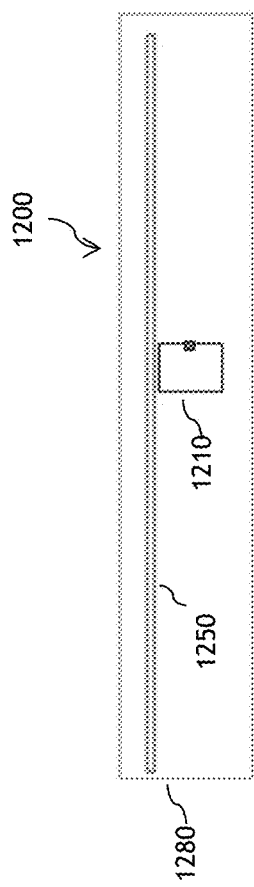
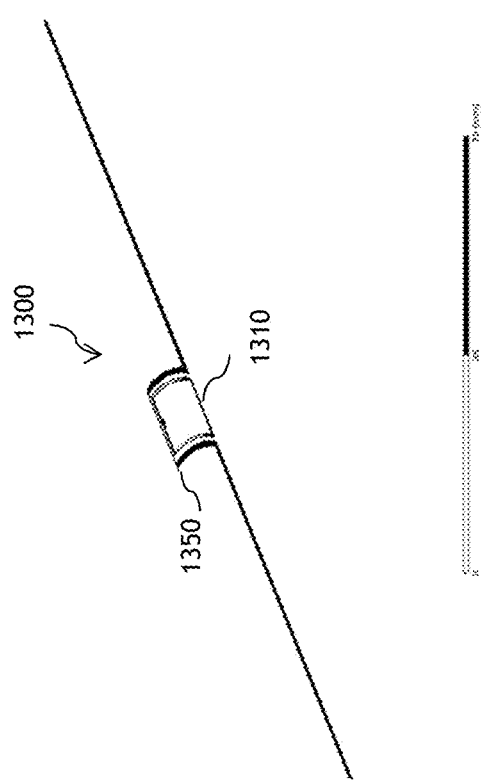

ELECTRICAL ACTIVITY SENSOR DEVICE FOR DETECTING ELECTRICAL ACTIVITY AND ELECTRICAL ACTIVITY MONITORING APPARATUS

This application claims the benefit, under 35 U.S.C. §119 of European Patent Application No. 14305542.4, filed Apr. 11, 2014.

TECHNICAL FIELD

The present invention relates to an electrical activity sensor device for detecting the electrical activity of an electrical device connected to a power supply network, in particular the change in electrical power state and to an electrical activity monitoring apparatus for monitoring the electrical activity of one or more electrical devices. The electrical activity sensor device may be based on a radio frequency identification device (RFID).

BACKGROUND

The monitoring of electrical activity of electrical devices finds many useful applications in areas such as energy consumption, building user activity profiles, and security or safety monitoring systems. For example, in a home environment knowledge of the activity of electrical appliances such as washing machines, lighting devices; cookers, toaster or a coffee machine may provide useful information on the household habits and user activity enabling a profile to be built up.

A known solution for monitoring the activity of electrical devices employs a complex electrical meter system based on remote controlled modules plugged into power outlets and configured to measure the electrical consumption of the electrical equipment powered from the respective power outlet. Such, remote controlled modules are typical equipped with a wireless communication system generally based on low power wireless technology to remotely monitor and control the corresponding electrical appliance. Such advanced meter systems require however a complex and expensive customized installation. Indeed, a recent research report on home automation and monitoring indicated price and technical complexity as being the main market hurdles and inhibitors against widespread adoption. Another drawback of such techniques is that electrical devices may be moved from one power outlet to another power outlet. Moreover some devices such as lighting devices are not always powered from a power outlet.

Other solutions for the detection of the activity of electrical devices are based on sensing their "EMI (electromagnetic interference) signature" by monitoring the powerlines at one or several points of the power supply network. These techniques require however a customised calibration and training process to learn the EMI signature of various devices. Moreover the EMI signatures may evolve with time. Complex signal processing techniques are required to disaggregate the signatures of the various active devices connected to the network and the obtained results are not always very accurate.

The present invention has been devised with the foregoing in mind.

SUMMARY

In a general form the invention concerns an electrical activity sensor device based on an antenna assembly comprising an antenna element for detection of a change in electrical power state of a device and a dipole type antenna for wireless transmission of data representative of the change in electrical power state.

According to a first aspect of the invention there is provided an electrical activity sensor attachable to a power cable of an electrical device and comprising an antenna assembly including an antenna element operable to magnetically couple with an electrical pulse generated in the power cable to induce an electrical signal in response to a change in electrical power state of the electrical device; and at least one dipole type antenna configured operate as a half wave dipole in the operating frequency range of the antenna and to magnetically couple to the antenna element wherein the dipole type antenna is operable to wirelessly transmit data representative of the power state change of the electrical device from the antenna to a remote radio frequency data reader.

Detection of electrical activity can thus be provided in a simplified and low cost manner. The antenna assembly has a dual function of electrical activity detection and transmission of electrical activity data. The operational range of the antenna element is extended since data is transmitted to a remote reader via the dipole type antenna. Improved coupling is provided with the electrical pulse of the power cable since interference from the wires of the power cable is reduced. Moreover, the antenna assembly is less susceptible to changes in the form of the power cable.

A change in the electrical power state of a device may include the switching ON of the device, the switching OFF of the device, the switching from a standby mode to an ON power state, and the switching from an ON power state to a standby mode.

In an embodiment, the antenna element is a loop antenna. The antenna element may be provided with a radio frequency identification circuit. The antenna element and the radio frequency identification circuit may form an RFID tag.

In an embodiment, the antenna element is coupled to the dipole type antenna at a coupling distance x from one end of the dipole type antenna, the coupling distance being based upon the input impedance of the radio frequency identification circuit.

Taking into account the input impedance of the radio frequency identification circuit helps to reduce the effect of interference from wires in the cable.

In one embodiment, the coupling distance x is such that the input impedance of the antennas of the antenna assembly matches the input impedance of the radio frequency identification circuit.

In one embodiment, the coupling distance x is based upon the radiation resistance of the dipole type antenna.

In one embodiment, the coupling distance x is such as to increase the radiation resistance of the dipole conductor In one embodiment, the size of the antenna element is adjusted according to the input impedance of the radio frequency identification circuit at the RF operating frequency.

In one embodiment, the distance between the antenna element and the dipole type antenna is adjusted according to the input impedance of the radio frequency identification circuit at the RF operating frequency.

In one embodiment, the dipole type antenna is formed in a helical shape. In one example the helical shape size is such that a single turn helix is provided when the dipole type antenna is wrapped around the cable.

In one embodiment, a plurality of dipole type antennas are provided, with at least one dipole type antenna being arranged on each side of loop antenna In one embodiment, the dipole type antennas are arranged parallel to one another and overlap at least partially In one embodiment, the dipole type antenna has at least one fold in its shape.

In an embodiment, the dipole type antenna is arranged to extend along at least two sides of the antenna element. For example part of the dipole type antenna may be folded around three sides of the antenna element.

In an embodiment, the antenna element may be a RFID tag device, for example a near field RFID tag. The use of a short range (near field) RFID tag combined with wireless transmission by the dipole type antenna enables power consumption to be reduced with respect to a long range (far field) RFID tag while enabling extended coverage to be provided by the dipole conductor.

In an embodiment, the antenna element is operable as a passive antenna element powered by electromagnetic induction via the power cable. This enables power consumption to be reduced by avoiding the use of batteries.

The data representative of the power state change of the electrical device may comprise identification data identifying the electrical activity sensor. For example the identification data may be enough to indicate an electrical power state change. In other embodiments the data representative of the power state change may be transmitted in addition to the identification data.

A second aspect of the invention provides an electrical activity monitoring apparatus for monitoring the electrical power status of at least one electrical device connected to a power supply network by a respective power cable and, the electrical activity monitoring apparatus comprising:

a reader module for reading data received wirelessly from at least one antenna sensor device attached to a respective power cable of an electrical device wherein the data is received from the antenna sensor device via wireless transmission from a dipole type antenna magnetically coupled to an antenna of the antenna sensor device and the data is representative of electrical power status change of the electrical device; and a monitor device for determining from the data received by the reader module, which electrical devices of the network have changed electrical power status.

A third aspect of the invention provides an electrical activity monitoring system comprising at least one electrical activity sensor, each electrical activity sensor being attachable to a power cable of an electrical device and comprising an antenna assembly including an antenna element operable to magnetically couple with an electrical pulse generated in the power cable to induce an electrical signal in response to a change in electrical power state of the electrical device; and at least one dipole type antenna configured operate as a half wave dipole in the operating frequency range of the antenna and to magnetically couple to the antenna element wherein the dipole type conductor is operable to wirelessly transmit data representative of the power state change of the electrical device from the antenna; a reader module for reading data received wirelessly from each electrical activity sensor; and a monitor device for determining from the data received by the reader module, which electrical devices of the network have changed electrical power status.

A further aspect of the invention relates to a gateway device comprising electrical activity monitoring apparatus according to the second aspect of the invention.

In an embodiment, the reader module is configured to read signals from the at least one electrical activity sensor in response to a detected change in power consumption measured by an electricity meter connected to the power supply network.

In an embodiment, a communication network interface is provided for connecting with a communication network such that data may be transmitted to or received from a remote server connected to the communication network.

In an embodiment the reader module is configured to trigger the transmission of one or more interrogation signals in response to a command signal received via the communication network.

In an embodiment the electrical activity monitoring system further includes an electricity meter connected to the electrical activity monitoring apparatus for monitoring electrical power consumption in the power supply network.

In an embodiment the reader module is configured to transmit interrogation signal to the electrical activity sensor devices in response to a detected change in power consumption measured by the electricity meter.

In some embodiments of the invention timing means are provided to determine how long an electrical appliance has been switched ON or switched OFF.

A further aspect of the invention relates to an electrical activity sensor attachable to a power cable of an electrical device for detecting an impulse generated in the power cable in response to a change in electrical power state of the electrical device, the electrical activity sensor comprising an antenna assembly including an RFID tag comprising an antenna element operable to magnetically couple with an electrical pulse generated in the power cable to induce an electrical signal in response to a change in electrical power state of the electrical device; and an RFID circuit; and at least one dipole type antenna configured operate as a half wave dipole in the operating frequency range of the RFID tag and to magnetically couple to the antenna element wherein the dipole type conductor is operable to wirelessly transmit data representative of the power state change of the electrical device from the RFID tag to a remote RFID reader.

A further aspect of the invention relates to an electrical activity monitoring apparatus for monitoring the electrical power status of at least one electrical device connected to a power supply network by a respective power cable and, the electrical activity monitoring apparatus comprising:

an RFID reader module for reading RFID data from at least one RFID tag device, each RFID tag device being attached to a respective power cable of an electrical device wherein the RFID data is received from the respective RFID tag via wireless transmission from a dipole type antenna magnetically coupled to an antenna of the RFID tag device and the RFID data is representative of electrical power status change of the electrical device; and a monitor device for determining from the RFID data received by the RFID reader module, which electrical devices of the network have changed electrical power status.

According to a further aspect of the invention there is provided an electrical activity monitoring system comprising at least one electrical activity sensor according to any embodiment of the first aspect of the invention for monitoring the electrical status of an electrical device, and an electrical activity monitoring apparatus according to any embodiment of the second aspect of the invention.

According to a further aspect of the invention there is provided an antenna assembly attachable to a power cable of an electrical device for detecting an impulse generated in the power cable in response to a change in electrical power state of the electrical device, the an antenna assembly including an antenna element, for example a loop antenna, operable to magnetically couple with an electrical pulse generated in the power cable to induce an electrical signal in response to a change in electrical power state of the electrical device; and at least one dipole type antenna configured operate as a half wave dipole in the operating frequency range of the antenna element and to magnetically couple to the antenna element wherein the dipole type conductor is operable to wirelessly transmit data representative of the power state change of the electrical device from the antenna assembly to a remote reader.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 4A is a block functional diagram of elements of a RFID sensor device in accordance with an embodiment of the invention;

FIG. 4B is a graphical diagram illustrating a signal processing process implemented by an RFID sensor in accordance with an embodiment of the invention;

FIG. 12 is a schematic diagram of an electrical activity sensor device in accordance with a sixth embodiment of the invention;

FIG. 13 is a schematic diagram of an electrical activity sensor device in accordance with a seventh embodiment of the invention;

DETAILED DESCRIPTION

Figure 1:
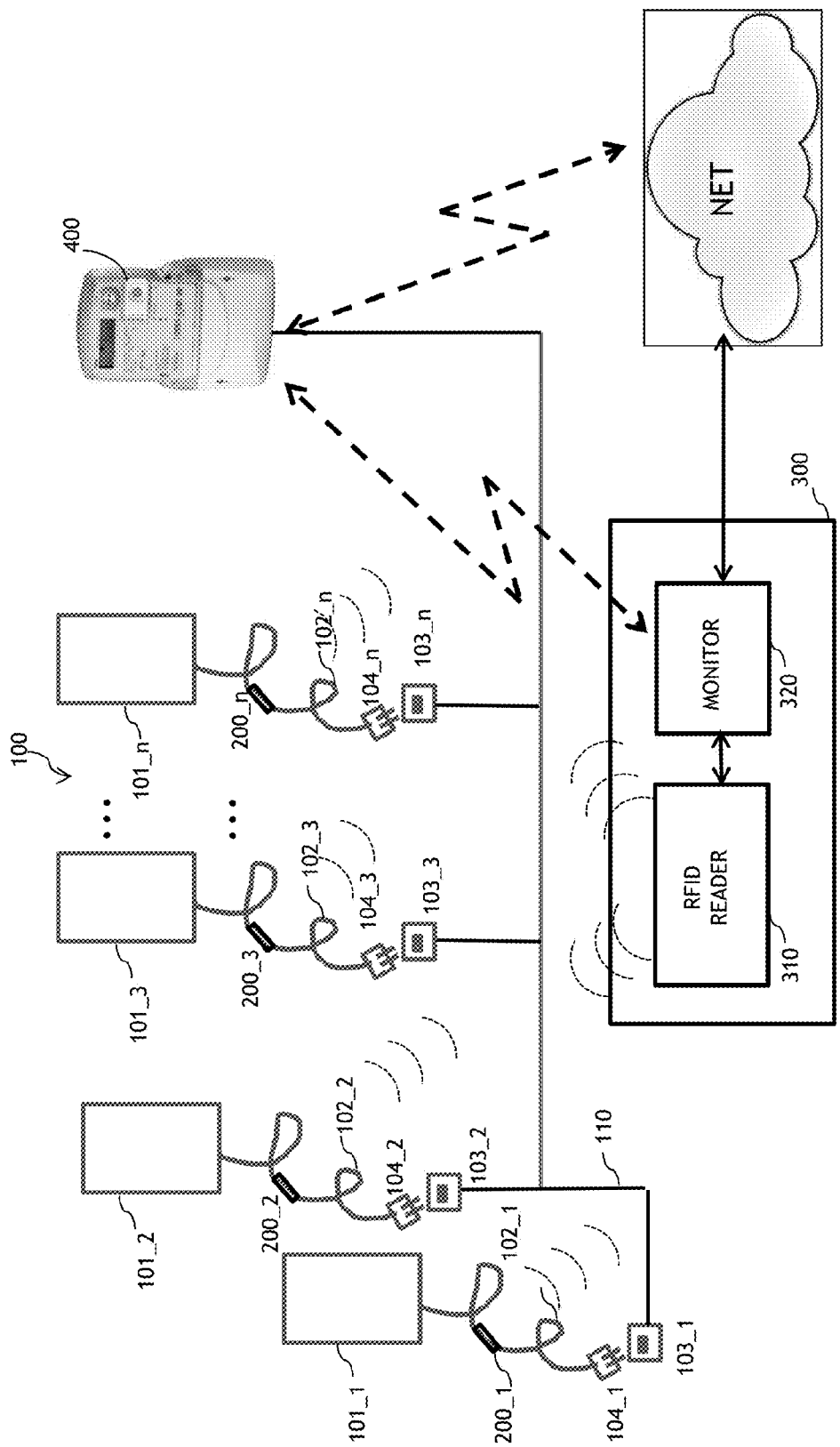
FIG. 1 is a schematic block diagram of an electrical activity monitoring system in which one or more embodiments of the invention may be implemented

FIG. 1 is a schematic block diagram of an electrical activity monitoring system in which one or more embodiments of the invention may be implemented. The electrical activity monitoring system 100 monitors the change in electrical status of n electrical devices 101_1 to 101_n. Each electrical device 101_1 to 101_n is connected by means of a respective electrical power cable 102_1 to 102_n to a power outlet 103_1 to 103_n of an electrical power supply network 110. It will be appreciated that while in the illustrated embodiment of FIG. 1 each electrical device 101_1 to 101_n is connected to a respective power outlet 103_1 to 103_n, in other embodiments of the invention a plurality of electrical devices may be connected to the same power outlet 103_x.

Each electrical power cable 102_1 to 102_n is provided with a respective plug 104_1 to 104_n for connecting the respective electrical power cable to a respective power outlet 103_1 to 103_n for connection to the power supply network 110.

Each electrical power cable 102_1 to 102_n is further provided with a respective electrical activity sensor 200_1 to 200_n. Each electrical activity sensor 2000_1 to 2000_n is attached to a respective power cable 102_1 to 102_n. The electrical activity sensor 2000_1 to 2000_n comprises an antenna assembly.

The electrical activity monitoring system 100 further includes an electrical activity monitoring apparatus 300. The power supply network 110 is typically provided with an electricity meter 400 for measuring electrical consumption in the power supply network 110. The electrical activity monitoring apparatus 300 may be connected to a communication network NET such as an Internet network so that data on the electrical activity of the system may be transmitted to a remote device, such as a remote electrical activity monitoring device for example the server of a remote an electrical activity monitoring service or an electricity power supplier company.

Figure 2:
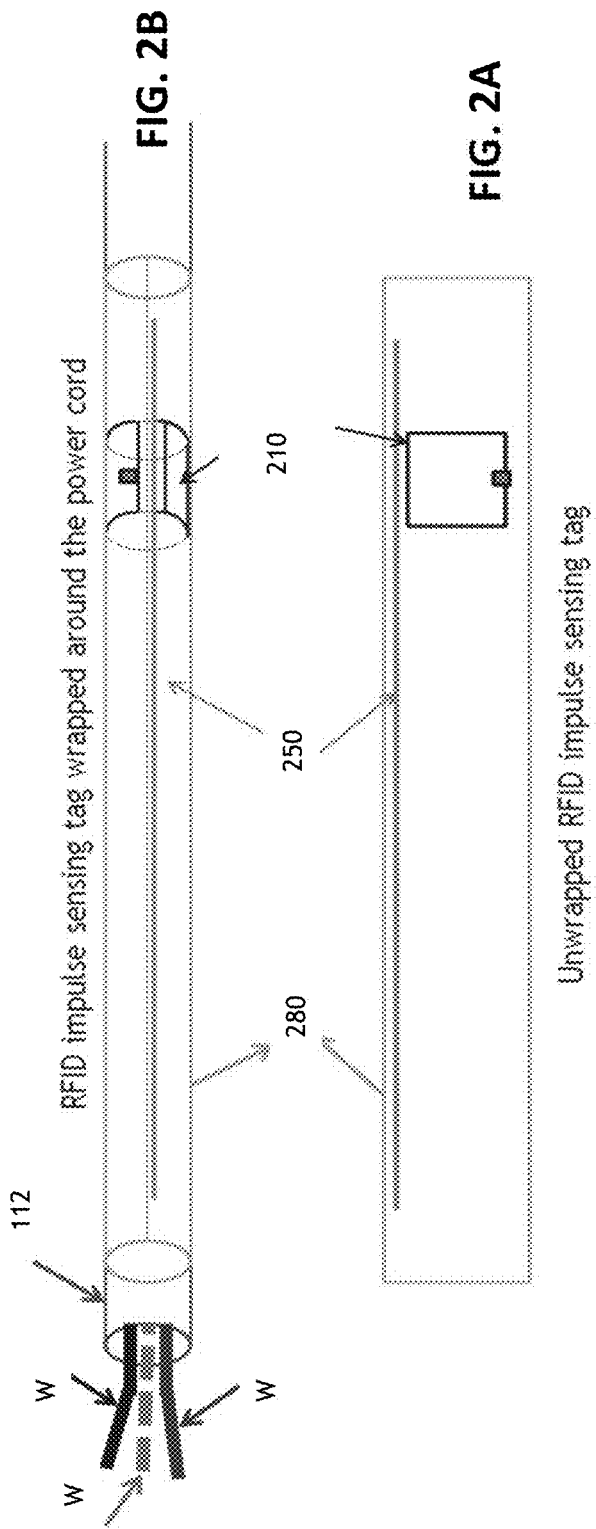
FIG. 2A is a schematic diagram of an electrical activity sensor device in accordance with a first embodiment of the invention.
FIG. 2B is a schematic diagram of the electrical activity sensor device of FIG. 2A mounted on a power cable.

FIG. 2A schematically illustrates an electrical activity sensor in accordance with an embodiment of the invention. The electrical activity sensor 200 comprises an antenna assembly including an radio frequency identification (RFID) sensor 201 and a dipole type antenna 250 provided on a flexible substrate 280. The antenna assembly may, for example be etched on the flexible support layer 280. The flexible support layer 280 may for example be a thin Polystyrene adhesive film.

With reference to FIG. 2A the RFID sensor 201 in accordance with an embodiment of the invention comprises a loop antenna 210 and an RFID circuit 202. The RFID circuit 202 is provided with a pulse detection module 220 and a memory chip 230 for storing data representative of an electrical status change and/or identification data identifying the RFID sensor 201. Each RFID sensor device 201 in the electrical monitoring system 100 is provided with an identification code enabling it to be identified by the monitoring device 300. An RFID sensor may also be referred to as an RFID tag, an RFID label, an RFID transponder and the like. While the loop antenna in the present embodiment is presented as a rectangular or square shape it will be appreciated that any form of loop antenna may be used.

The RFID sensor 201 may for example be a near field/short range RFID tag operating in the UHF frequency band, for example in the range from 800 MHz to 960 MHz, such as the region of 860 MHz or 900 MHz, or in the region of 433 MHz; or operating in the HF frequency band, for example in the region of 13.6 MHz.

RFID may be considered as a non-specific short range device. It can use frequency bands without a license. Nevertheless, RFID should typically be compliant with local regulations (ETSI, FCC etc.)

LF: 125 kHz-134.2 kHz: low frequencies,
HF: 13.56 MHz: high frequencies,
UHF: 860 MHz-960 MHz: ultra high frequencies,
SHF: 2.45 GHz: super high frequencies The loop antenna 210 of the RFID sensor device 201 has a dual function. Firstly, the antenna 210 of an RFID sensor device 200_x is used to detect the electrical pulse generated in the respective power cable 102_x when the corresponding electrical device 101_x undergoes a change in electrical power state, for example is switched ON or switched OFF. Indeed, the generated electrical pulse results from the change in power state of the respective electrical device 101_x. When an electrical device 101_x is switched ON or OFF, a current pulse flows in its respective power cable 102_x. The loop antenna 210 of the respective RFID sensor device 200_x attached to the power cable 102_x couples magnetically to the current pulse generating an electrical pulse which can be detected by the pulse detection module 220. The electric state change is stored in the RFID chip memory 230.

The second function of the antenna 210 is to electromagnetically couple the dipole-type antenna 250 to the RFID circuit 202.

The dipole type antenna 250 comprises a half-wave length dipole-type conductor having a length L, sized, to operate in the RF operating frequency range of the RFID sensor 200.

FIG. 2B schematically illustrates the antenna assembly of FIG. 2A attached to the power cable 102 of an electrical device 101.

The power cable 102 comprises an insulating sheath 112 enclosing a plurality of conducting wires W for providing power from the power supply network 110 to the corresponding electrical device 101.

The flexible substrate 280 is wrapped at least partially around the power cable 102 and adheres by means of adhesive to the insulating sheath 112. The loop antenna 210 of the RFID sensor is wrapped at least partially around the power cable 102. The dipole type antenna 250 extends along the power cable 102, with part of the dipole antenna 250 extending between opposing ends of the loop antenna 210 wrapped around the power cable 102 to enable magnetic coupling between the loop antenna 210 and the dipole type antenna 250.

In order to enable the maximum transfer of RF energy between the RFID sensor 201 and the dipole type antenna 250, the half-wave dipole of the dipole like antenna 250 is magnetically coupled to the loop antenna 210 of the RFID sensor 200 in an impedance plane of the resonating dipole for which the radiation impedance of the half-wave dipole 250 (in presence of the power cable wires) transformed through the wire loop is almost equal to the real part of the RFID circuit 220.

In this way the dipole-type antenna 250 coupled to the loop antenna 210 behaves as an efficient half-wave dipole at the operating frequency of the RFID sensor 201 despite the very close proximity of the wires W of the power cable 102.

FIG. 4A is a schematic diagram illustrating an example of operation of the pulse detection module 220 of the RFID sensor 201. When the electrical power state of an electrical device changes, for example by being switched ON or OFF a corresponding power state change pulse signal A is picked up by the loop antenna 210, by means of a magnetic coupling effect. When the amplitude of the power state change pulse signal A exceeds a predetermined threshold (1V for example), a block comparator 221 detects an input pulse signal and in response changes the state of the output signal B. In order to avoid multi triggering, a temporization device 222 may be connected to the output of the comparator 221 to provide a signal C at its output which corresponds to the signal issued from the comparator during a set temporization time. A D flip flop module 223 generates a state bit D. The state bit D is changed for each clocked impulse since the D Flip Flop module 223 is clocked by the output signal C of the temporization module 222. Consequently the last bit of bit signal D changes state at each detected pulse (at switch on or off). The state can thus be used to indicate an electrical power state change. The bit value is stored in the memory chip 230 of the RFID sensor device 201. This information representative of a change of electrical power state of respective electrical device 101_x can then be transmitted with the identification code ID RFID sensor device 200 to the monitoring device 300 by the antenna assembly 200. An example of signals A, B, C and D of the operation of FIG. 4A are graphically represented in FIG. 4B.

In particular embodiments of the invention by knowing the initial electrical power state of the electrical device 101_x at counter reset, it is possible to determine from the state of bit signal D whether the electrical change corresponds to an ON/OFF electrical status change or an OFF/ON electrical status change. Moreover, by knowing the ON or OFF power state of the electrical device at the previous reading the ON or OFF power state at the subsequent reading can be deduced.

When activated by an electrical power state change, the loop antenna 210 of the RFID sensor 201 transfers data indicative of an electrical state change from the memory chip 222 to the dipole-type antenna 250 and the data is transmitted wirelessly from the electrical activity sensor 200 to the RFID reader 310 of the monitoring device 300 by the radiating dipole type antenna 250.

Data representative of the electrical state change may be transferred by the electrical activity sensor 200 to the RFID reader 310, for example at each interrogation by the RFID reader operating in the RFID frequency band.

In the case where the RFID sensor 201 is a passive type RFID tag the antenna 210 acts as a power-coupling inductor which can harvest electrical power from the coupling between the loop antenna 210 and the electrical pulse generated in the power cable 102 to operate the modules of the RFID sensor device 200, such as the memory chip 230 and the pulse detection module 220. Since the RFID sensor 201 in such an embodiment is a passive RFID tag device, energy consumption can be minimized since power is not being supplied constantly to the RFID sensor 201 from a power supply such as a battery. It will be appreciated, however, that in alternative embodiments of the invention the RFID sensor 201 may be an active type RFID tag powered by its own power supply means or a battery assisted passive type RFID tag.

The electrical activity sensor 200 may be attached to the respective power cable 102_x by any form of fixation means such as for example by adhesive such as glue, sticking tape, or a sticker, by a mechanical connection such as for example staples, screws, nails; or by being embedded in the insulating sheath cover 112 of the respective power cable 102_x.

Figure 5B:
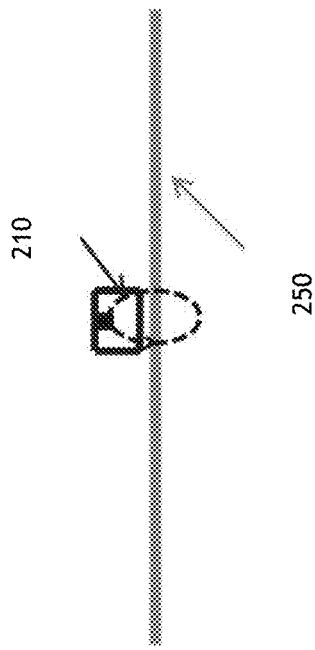
FIG. 5B schematically illustrates an arrangement of a half-wave dipole and a loop antenna.
Figure 5A:
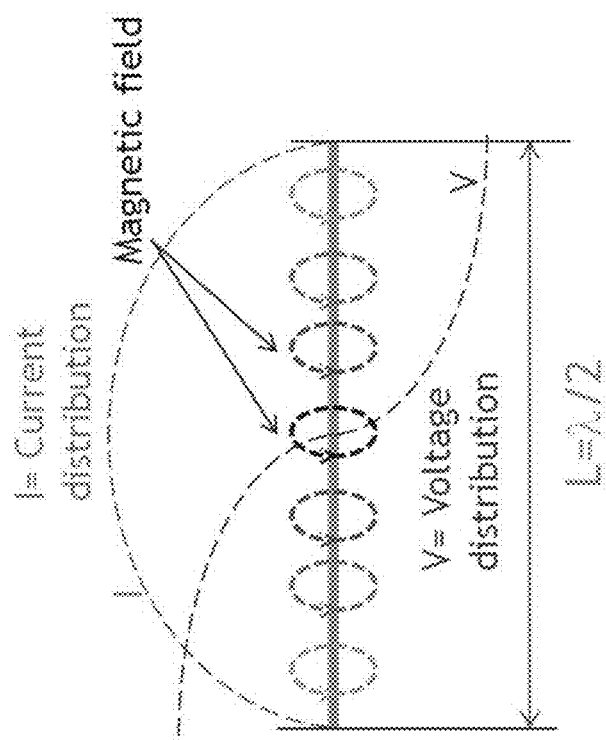
FIG. 5A graphically illustrates current voltage and magnetic field distributions along a half-wave dipole.

FIG. 5A graphically illustrates current and voltage distributions along a half-wave dipole and the corresponding magnetic field. The magnetic field is maximum at the middle of the dipole and minimum at the edges. Thus, when in free space, the optimum magnetic coupling of the dipole type antenna 250 to the loop antenna 210 of the RFID sensor 201 would be obtained at the center of the dipole as illustrated in FIG. 5B. The inductive coupling between the loop antenna 210 and the resonant dipole type antenna 250 may be modeled, for example by a transformer with a mutual inductance of M. In this way the input impedance of the antenna assembly $Z_a$ at the edges of the loop may be expressed as:

$$Z_a = R_a + jX_a = Z_{loop} + (\omega M)^2/Z_r \qquad (1)$$

where: $\omega = 2\pi f$; f=resonant frequency; $R_a$ and $X_a$ represent the real and imaginary parts of the input impedance of the antenna assembly 200, $Z_{loop}$ represents the impedance of the loop antenna 210 which is mainly inductive and generally equal to the loop inductance at the resonant frequency, $Z_r$ is the dipole radiation resistance of a symmetrical dipole (i.e. dipole excited at its center).

For optimal matching to the impedance of the RFID circuit 202, the real and imaginary part of the input impedance of the antenna assembly 200 should be the conjugate of the impedance of the RFID circuit 202. For example, a typical input impedance of an RFID circuit is equivalent to an RC parallel circuit with $R \approx 1$ to $2$ k$\Omega$ and $C \approx 1$ to $2$ pF, giving typical values of $R_a \approx 10\Omega$ and $X_a \approx -100\Omega$ at an operating frequency of 900 MHz. Thus, in this example the size of the loop antenna 210 and the distance between the loop antenna 210 and the dipole type antenna 250 may be adjusted so that $Z_a = R_a + jX_a$ is approximately equal to $10\Omega + j \times 100\Omega$ at 900 MHz.

Figures 6A, 6B:
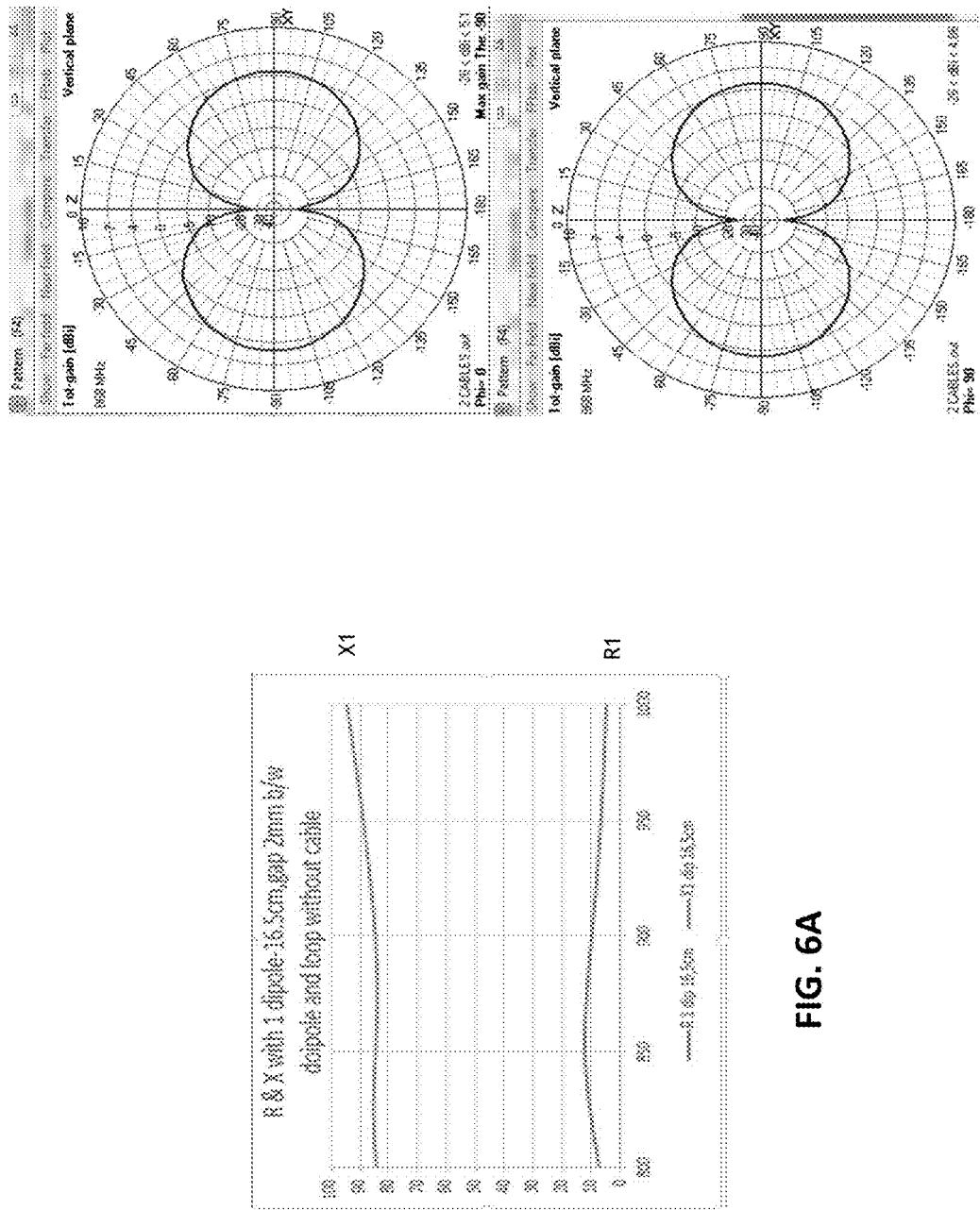
FIG. 6A graphically illustrates an example of simulated antenna input impedance for an antenna assembly in free space.
FIG. 6B graphically illustrates an example of simulated antenna pattern in two orthogonal planes for an antenna assembly in free space.
Figure 7B:
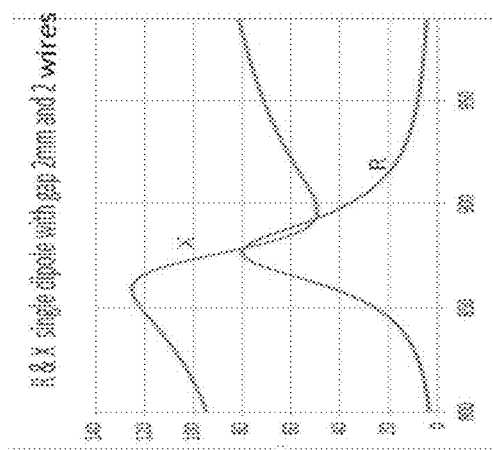
FIG. 7B graphically illustrates an example of simulated antenna input impedance for an antenna assembly in the presence of a cable.
Figure 7A:
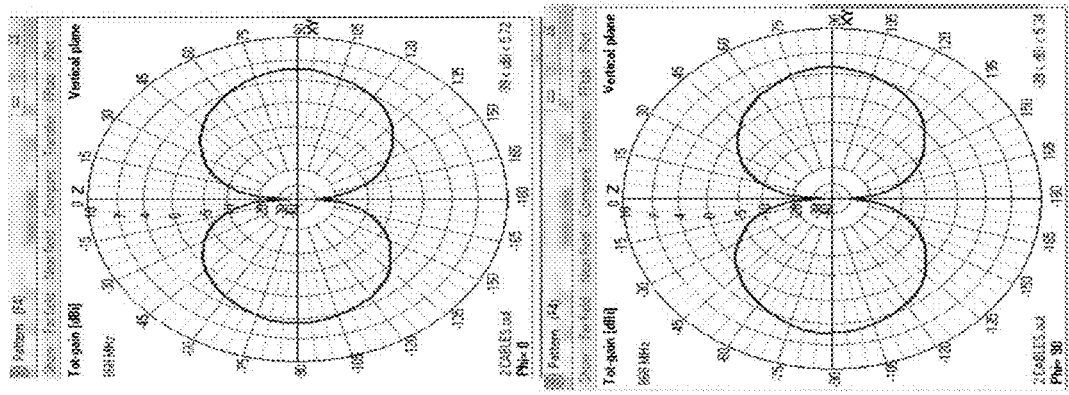
FIG. 7A graphically illustrates an example of simulated antenna pattern in two orthogonal planes for an antenna assembly in the presence of a power cable.

FIG. 6A graphically illustrates an example of simulated real (R1) and imaginary (X1) parts of the input impedance of the antenna assembly of FIG. 5B, comprising a dipole type antenna of length 16.5 cm excited through an inductive square loop antenna having 1 cm sides with a 2 mm gap between the loop antenna and the dipole type antenna. FIG. 6B graphically illustrates the corresponding radiation patterns generated in 2 orthogonal planes. These results show fairly good matching of typical RFID circuits over a relatively wide frequency bandwidth and a typical dipole radiation pattern. However, when the antenna assembly is wrapped around the power cable as shown in FIG. 2B, while the radiation pattern remains almost unchanged as graphically illustrated in FIG. 7A, the input impedance of the antenna assembly is significantly modified with a sensitive reduction in the frequency matching bandwidth to the RFID circuit and a dramatic increase of the real part of the antenna input as graphically illustrated in FIG. 7B.

In order to better match the input impedance of the antennas of the antenna assembly to the RFID circuit, the real part of the input impedance of the antenna assembly should be significantly reduced. With reference to equation (1) that means that the radiation resistance Zr of the dipole type antenna should be significantly increased.

Knowing that the radiation resistance Zr of a half-wave dipole driven at a distance x from its end is expressed as:

$$Zr = R0/\sin^2(2\pi x/\lambda);$$

where:
R0=radiation resistance when the dipole is driven at its center; theoretically equal to 73$\Omega$ for an infinitely thin dipole
$\lambda$=wavelength at resonant frequency The idea is to adjust the radiation resistance Zr of the dipole type antenna 250 to any arbitrary value greater than 73$\Omega$ by moving the driving point position corresponding to position of the coupling with the loop antenna 210 from the center of the dipole type antenna 250 towards one end of the dipole type antenna 250 as illustrated in FIGS. 2A and 2B.

Accordingly based on the above observations in embodiments of the invention the loop antenna 210 is coupled to the dipole type antenna 250 at coupling position located at a distance x from the end of the dipole type antenna 250 based upon the input impedance of the RFID circuit 202. In this way the dipole-type conductor 250 coupled to the loop antenna 210 behaves as an efficient half-wave dipole at the UHF working frequency) despite the very close proximity of the 2 or 3 wires of the power supply.

In a preferred embodiment the loop antenna 210 is coupled to the dipole type antenna 250 at a distance x from the end of the dipole conductor 250 so that the input impedance of the antenna assembly matches the input impedance of the RFID circuit 220. In particular the loop antenna 210 is coupled to the dipole type antenna 250 at a distance x from the end of the dipole conductor 250 based upon the radiation resistance of the dipole conductor 250. Preferably the loop antenna is coupled to the dipole at a coupling position located a distance x from the end of the dipole conductor to increase the radiation resistance Zr of the dipole conductor 250.

Figure 8:
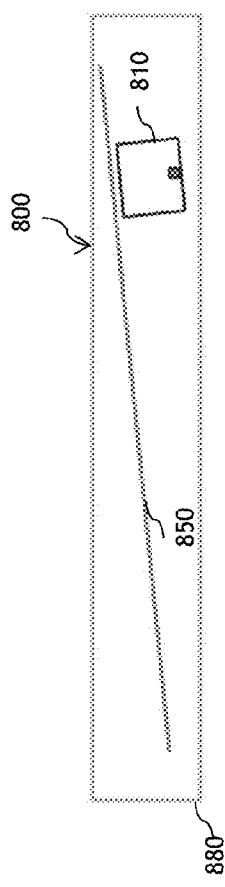
FIG. 8 is a schematic diagram of an electrical activity sensor device in accordance with a second embodiment of the invention.

FIG. 8 schematically illustrates an electrical activity sensor 800 in accordance with a second embodiment of the invention. The electrical activity sensor 800 comprises an RFID sensor 801 and a dipole type antenna 850 operating in a similar manner to the RFID sensor 201 and the dipole type antenna 250 of the first embodiment of the invention. In the second embodiment the dipole type antenna 850 has a helical shape, in particular with a sizing providing a single turn helix when wrapped around the respective power cable 102. In this embodiment the symmetry of the radiation pattern of the dipole type antenna is improved.

Figure 9:
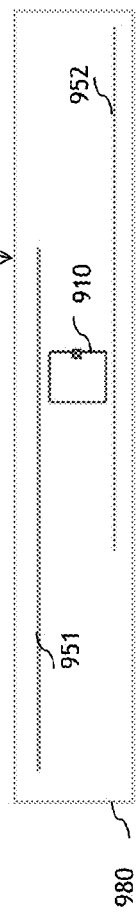
FIG. 9 is a schematic diagram of an electrical activity sensor device in accordance with a third embodiment of the invention.

In further embodiments of the invention, the antenna assembly may comprise a plurality of dipole type conductor antennas. For example, FIG. 9 schematically illustrates an electrical activity sensor 900 in accordance with a third embodiment of the invention. The electrical activity sensor 900 comprises an RFID sensor 901 operating in a similar manner to the RFID sensor 201 of the first embodiment and a plurality of dipole type antennas 951, 952 operating in a similar manner to the dipole type antenna 250 of the first embodiment of the invention. In the third embodiment two dipole type antennas 951 and 952 are provided, with a dipole type antenna being arranged on each side of the loop antenna 910 of the RFID sensor 900. The two dipole type antennas 951 and 952 are arranged to extend at least partially parallel to one another so that there is a region of overlap between the two dipole type antennas 951 and 952.

Figure 10:
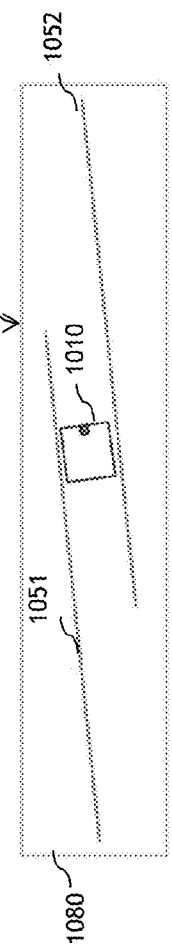
FIG. 10 is a schematic diagram of an electrical activity sensor device in accordance with a fourth embodiment of the invention.

FIG. 10 schematically illustrates an electrical activity sensor 1000 in accordance with a fourth embodiment of the invention. The electrical activity sensor 1000 comprises an RFID sensor 1001 operating in a similar manner to the RFID sensor 201 of the first embodiment and a plurality of dipole type antennas 1051, 1052 operating in a similar manner to the dipole type antenna 850 of the second embodiment of the invention. In the fourth embodiment two dipole type antennas 1051 and 1052 are provided, with a dipole type antenna being arranged on each side of the loop antenna 1010 of the RFID sensor 1001. The two dipole type antennas 1051 and 1052 each have a helical shape, in particular with a sizing providing a single turn helix when wrapped around the respective power cable 102. The two dipole type antennas 1051 and 1052 are arranged to extend at least partially parallel to one another.

Figure 11:
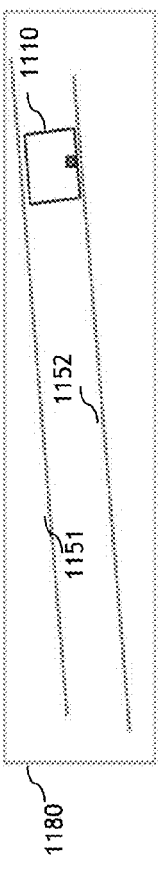
FIG. 11 is a schematic diagram of an electrical activity sensor device in accordance with a fifth embodiment of the invention.

FIG. 11 schematically illustrates an electrical activity sensor 1100 in accordance with a fifth embodiment of the invention. The electrical activity sensor 1100 comprises an RFID sensor 1101 operating in a similar manner to the RFID sensor 201 of the first embodiment and a plurality of dipole type antennas 1151, 1152 operating in a similar manner to the dipole type antenna 250 of the first embodiment of the invention. In the fifth embodiment two dipole type antennas 1151 and 1152 are provided, with a dipole type antenna being arranged on each side of the loop antenna 1110 of the RFID sensor 1101. The two dipole type antennas 1151 and 1152 each have a helical shape, in particular with a sizing providing a single turn helix when wrapped around the respective power cable 102. The two dipole type antennas 1151 and 1152 are arranged to extend parallel to one another and to overlap along most of their length.

In further embodiments of the invention the dipole type antenna may be formed as a dipole conductor with at least one fold. The radiation resistance of a folded dipole is greater than the radiation resistance of a classical half-wave dipole, Depending on the folding configuration the radiation resistance may be four times that of a classical half-wave dipole. That helps to increase the dipole radiation resistance in the presence of the power cable to improve the coupling. For example FIG. 12 schematically illustrates an electrical activity sensor 1200 in accordance with a sixth embodiment of the invention. The antenna assembly 1200 comprises an RFID sensor 1201 operating in a similar manner to the RFID sensor 201 of the first embodiment and a dipole type antenna 1250 operating in a similar manner to the dipole type antenna 250 of the first embodiment of the invention. In the sixth embodiment the dipole type antenna 1250 is folded into a rectangular like shape and arranged alongside the loop antenna 1210 of the RFID sensor 1201.

FIG. 13 schematically illustrates an electrical activity sensor 1300 in accordance with a seventh embodiment of the invention. The electrical activity sensor 1300 comprises an RFID sensor 1301 operating in a similar manner to the RFID sensor 201 of the first embodiment and a dipole type antenna 1350 operating in a similar manner to the dipole type antenna 250 of the first embodiment of the invention. In the seventh embodiment the dipole type antenna 1350 extends along the power cable with part of the dipole type antenna being arranged around three sides of the loop antenna 1310 of the RFID sensor 1301. This increases the coupling between the loop antenna 1310 and the dipole type antenna 1350.

Figure 14:
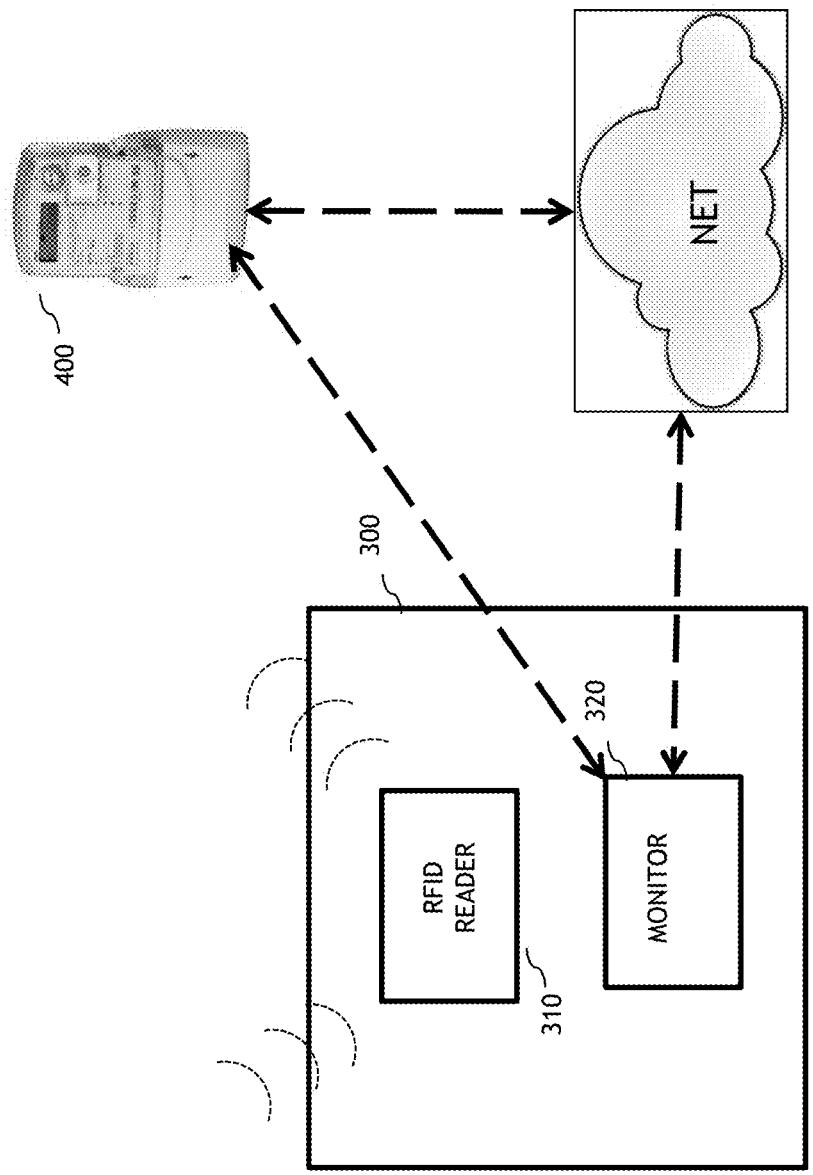
FIG. 14 is a schematic block diagram of an electrical activity monitoring apparatus in accordance with an embodiment of the invention.

FIG. 14 is a block diagram schematically illustrating an electrical activity monitoring apparatus 300 in accordance with an embodiment of the invention. The electrical activity monitoring apparatus 300 comprises an RFID reader device 310 and a monitoring device 320 for processing RFID data signals.

The RFID reader device 310 is a far field RFID type reader and is configured to wirelessly receive RFID data signals transmitted from the electrical activity sensors attached to the power cables 102 of the network via wireless transmission from the respective dipole type antenna 250 and to send RFID interrogation signals to the RFID sensors 200 via wireless transmission to the respective dipole type antennas 250.

Monitoring device 320 receives data from the RFID reader device 310 indicative of the electrical activity status of the electrical devices 101_1 to 101_n in the electrical activity monitoring system 100.

In one particular embodiment of the invention the monitoring device 320 is connected to a smart type electricity meter 400 connected to the power supply network 110 of the system. The electricity meter 400 and the monitoring 320 device may be connected by a wireless or wired connection. The smart electricity meter 400 is configured to monitor the power consumption of electrical devices 101_1 to 101_n connected to the power network 110. The smart electricity meter 400 is configured to detect a change in power consumption: for example an increase in the rate of power consumption which may result from the switching ON of one or more electrical devices 101_1 to 101_n supplied by the power network 110, or a decrease in the rate of power consumption which may result from the switching OFF or to STANDBY of one or more of the electrical devices 101_1 to 101_n supplied by the power network 110. In response to the detected change in power consumption a command signal is transmitted from the monitoring device 320 to the RFID reader device 310 to activate an RFID reading process. The RFID reader device 310 in response to the command signal transmits an interrogation signal to the RFID sensor devices 201_1 to 201_n in order to read the electrical status data stored in the respective RFID memory chips 230_1 to 230_n of the RFID sensor devices 201_1 to 201_n. The interrogation signal to be sent from the RFID reader 310 to one or more electrical activity sensors 200s by wireless transmission. Response signals are then transmitted by the electrical activity sensors 200_1 to 200_n towards the monitoring apparatus 300 by means of the respective dipole type antennas 250. The response signals from the RFID sensor devices 200_1 to 200_n each include the identification code of the respective electrical devices 102_1 to 102_n and the corresponding electrical power state change information stored in the respective RFID memory chip 230. The collected electrical power state change information signals are received and read by the RFID reader device 310. The processed electrical power state change activity information is then transmitted to the monitoring device 320.

Monitoring device 310 may further process the received power state change information or transfer the power state change information to another device, such as a remote device connected via a communication network.

For example, if an electrical device 101_x, for example a coffee machine, connected to a household power supply network 110 is switched ON (for example from an OFF power state or from a STANDBY mode):

1. The total power consumption will increase by an amount corresponding to the power consumed by the coffee machine. This change in power consumption will be measured by smart electricity meter 400.

2. The current impulse generated in the corresponding power cable in response to the switch on activates the corresponding RFID sensor device 201 attached to the respective power cable, and the status information change (OFF to ON) is stored in the RFID memory chip by switching a bit (the "state bit") from 0 (corresponding to OFF state) to 1 (corresponding to ON state)

The increase in power consumption measured by the smart electricity meter 400 may be detected by the monitoring device 320. In response to the detected increase a read command is sent to the RFID reader device 300 to trigger a read phase of the RFID reader device 310. The RFID reader module 310 reads all the RFID sensor devices 201_1 to 201_n of the electrical devices 101_1 to 101_n connected to the power network 110 by transmitting interrogation signals. The read information of each RFID sensor 201_1 and includes its identification and its electrical ON/OFF change status.

In some embodiments of the invention by comparing the electrical change status of all the RFID sensor devices read with the previous one stored in an electrical devices status dataset, at the previous reading phase, it is possible to infer which electrical device has been powered on and the electrical devices status dataset may be updated accordingly.

In other embodiments of the invention, the state of the respective state bit signal stored on the corresponding RFID memory chip can be used to identify which electrical device or devices have been switched on or off.

In some particular embodiments of the invention for an electrical device an electrical pulse generated by an ON to OFF or STANDBY electrical power state change, may be distinguished from an electrical pulse generated by an OFF or STANDBY to ON electrical power state change by characterizing the pulse signals. The impulse detector 220 of the RFID sensor device 201 of such embodiments is configured to detect from the characteristics of the generated electrical pulse signal whether the electrical pulse results from an ON to OFF or STANDBY power state change or from an OFF or STANDBY to ON power state change.

In further embodiments the impulse detector may be configured to distinguish between an OFF to ON and a STANDBY to ON; and to distinguish between an ON to STANDBY and an ON to OFF, by characterizing the resulting pulse signals.

In another embodiment of the invention the power consumed by an electrical device 101_x may be determined, for example by detecting an OFF to ON power state change or a standby to ON power state change and then determining the duration of time for which the electrical device is placed in an ON state. Data representative of the power consumption may then be transferred from the corresponding RFID sensor device 200_x to the RFID reader device 300 by the antenna assembly in the same way as data representative of the electrical power state change is transmitted to the RFID reader device 300.

The electrical power state change data or consumption data may be processed to provide relevant information on electrical activity of the power network 110, such as for example to build a household user profile, to detect and warn of increased electrical power consumption, and/or to provide recommendations for reducing energy consumption In other embodiments of the invention, rather than sending an interrogation signal from the RFID reader to the RFID sensor devices in response to a command from the monitoring device 320 the RFID reader may send interrogation signals automatically to the RFID sensor devices without being commanded by the monitoring device; for example on a periodic basis.

In some embodiments of the system that monitoring device may be part of a home gateway system connected to an external internet network. Real time tracking of the total home power consumption could be provided by the home electricity provider via the internet network. For example the electricity provider could trigger reading phases of the RFID reader by transmitting signals from a remote server via the gateway device.

Figure 15:
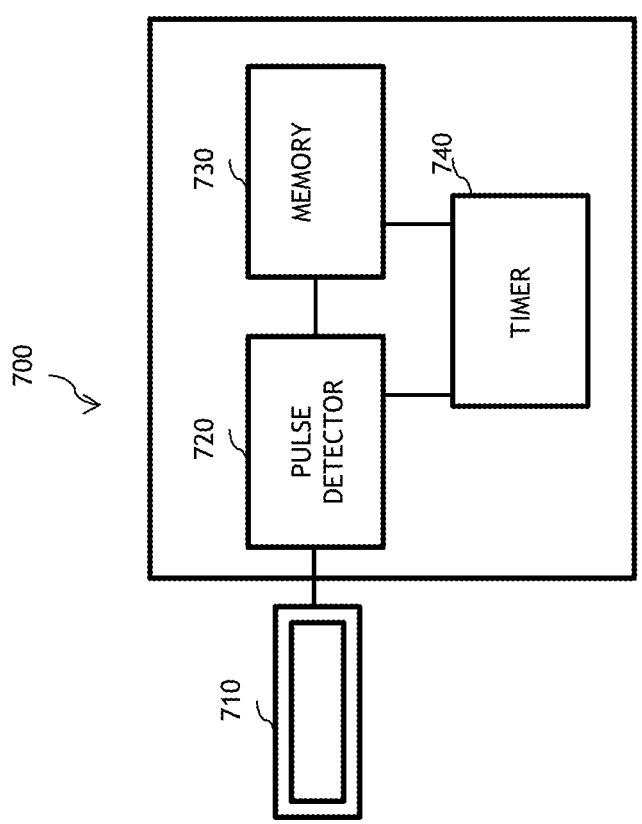
FIG. 15 is a schematic block diagram of an RFID sensor device in accordance with a further embodiment of the invention.

FIG. 15 is a schematic functional block diagram of an RFID sensor device 701 in accordance with a further embodiment of the invention.

Figure 3:
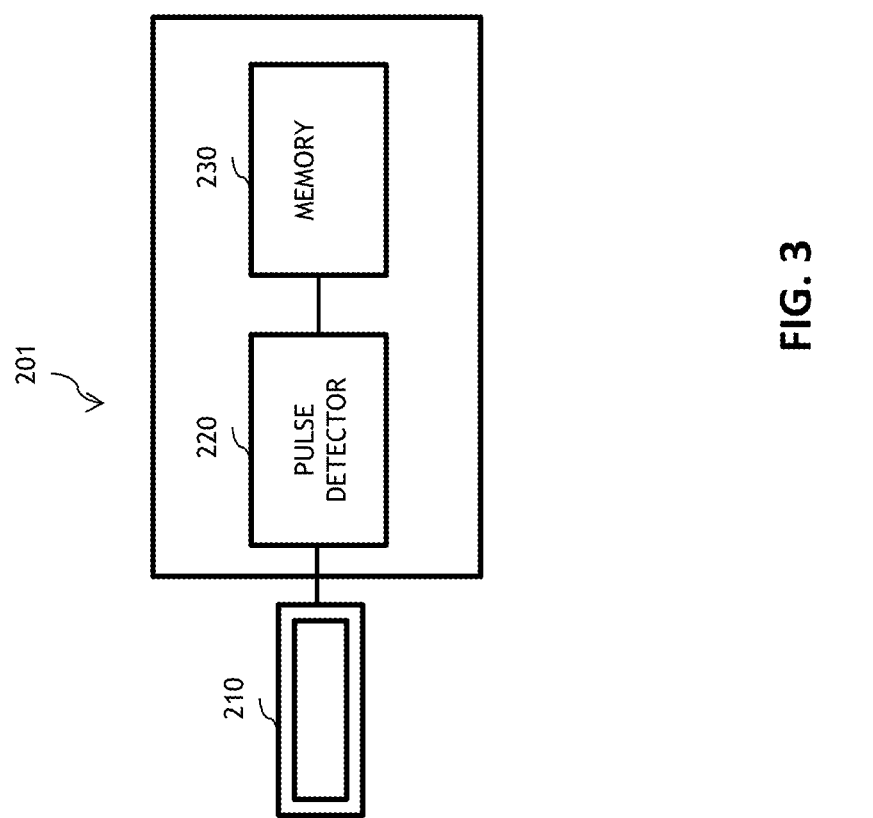
FIG. 3 is a block diagram of an RFID sensor device in accordance with an embodiment of the invention.

The RFID sensor device 700 comprises a loop antenna 710, a pulse detection module 720 and a memory chip 730 for storing identification data of the RFID sensor and data representative of an electrical status change. These elements operate in a similar way to corresponding elements of the embodiment of FIG. 3. With respect to the embodiment of FIG. 3 the RFID sensor device 700 further includes a timer 740. The timer 740 is used to measure the duration of time for which the electrical device has been changed electrical state by measuring the amount of time from when a pulse was detected by the pulse detector 720. The time data may be stored in memory 730 and transmitted with the ID data and electrical status data to the RFID reader. The timing data enables the amount of time a device has been switched on or off to be determined.

Although the present invention has been described hereinabove with reference to specific embodiments, the present invention is not limited to the specific embodiments, and modifications will be apparent to a skilled person in the art which lie within the scope of the present invention.

For instance, while the foregoing examples have been described with respect to a household power network system, it will be appreciated that embodiments of the invention may be applied to any power network to which electrical devices are connected. Moreover the system could be applied in security or safety applications to identify electrical devices which have been switched on or switched off.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. An electrical activity sensor attachable to a power cable of an electrical device and comprising an antenna assembly including
   an antenna element operable to magnetically couple with an electrical pulse generated in the power cable in response to a change in electrical power state of the electrical device to induce an electrical signal; and at least one dipole type antenna configured to operate as a half wave dipole in the operating frequency range of the at least one dipole type antenna and to magnetically couple to the antenna element wherein the at least one dipole type antenna is operable to wirelessly transmit data representative of the power state change of the electrical device from the antenna element to a remote radio frequency data reader.

2. The electrical activity sensor according to claim 1 wherein the antenna element is a loop antenna.

3. The electrical activity sensor according to claim 1 wherein the antenna element is provided with a radio frequency identification circuit comprising memory.

4. The electrical activity sensor according to claim 3 wherein the antenna element is coupled to the at least one dipole type antenna at a coupling distance x from one end of the at least one dipole type antenna, the coupling distance being based upon the input impedance of the radio frequency identification circuit.

5. The electrical activity sensor according to claim 4 wherein the coupling distance x is such that the input impedance of the antenna assembly matches the input impedance of the radio frequency identification circuit.

6. The electrical activity sensor according to claim 4 wherein the coupling distance x is based upon the radiation resistance of the at least one dipole type antenna.

7. The electrical activity sensor according to claim 6 wherein the coupling distance x is such as to increase the radiation resistance of the at least one dipole type antenna.

8. The electrical activity sensor according to claim 3 wherein the size of the antenna element is adjusted according to the input impedance of the radio frequency identification circuit at the RF operating frequency.

9. The electrical activity sensor according to claim 3 wherein the distance between the antenna element and the at least one dipole type antenna is adjusted according to the input impedance of the radio frequency identification at the RF operating frequency.

10. The electrical activity sensor according to claim 1 wherein the at least one dipole type antenna is formed in a helical shape.

11. The electrical activity sensor according to claim 1 comprising a plurality of dipole type antennas, with at least one dipole type antenna being arranged on each side of a loop antenna.

12. The electrical activity sensor according to claim 11 wherein the dipole type antennas are arranged to overlap at least partially.

13. The electrical activity sensor according to claim 1 wherein the at least one dipole type antenna has at least one fold in its shape.

14. The electrical activity sensor according to claim 1 wherein the at least one dipole type antenna is arranged to extend along at least two sides of the antenna element.

15. The electrical activity sensor to claim 1, wherein the antenna element comprises a near field RFID tag.

16. An electrical activity monitoring apparatus for monitoring the electrical power status of at least one electrical device connected to a power supply network by a respective power cable and, the electrical activity monitoring apparatus comprising:
a reader module for reading data received wirelessly from an antenna sensor device attached to a respective power cable of an electrical device wherein the data is received from the antenna sensor device via wireless transmission from a dipole type antenna of the antenna sensor device magnetically coupled to an antenna of the antenna sensor device and the data is representative of electrical power status change of the electrical device; and
a monitor device for determining from the data received by the reader module, which electrical devices of the network have changed electrical power status.

17. An electrical activity monitoring system comprising
at least one electrical activity sensor, each electrical activity sensor being attachable to a power cable of an electrical device and comprising an antenna assembly including
an antenna element operable to magnetically couple with an electrical pulse generated in the power cable in response to a change in electrical power state of the electrical device to induce an electrical signal; and
at least one dipole type antenna configured to operate as a half wave dipole in the operating frequency range of the at least one dipole type antenna and to magnetically couple to the antenna element wherein the at least one dipole type antenna is operable to wirelessly transmit data representative of the power state change of the electrical device from the antenna element;
a reader module for reading data received wirelessly from each electrical activity sensor; and
a monitor device for determining from the data received by the reader module, which electrical devices of the network have changed electrical power status.

\* \* \* \* \*